United States Patent
Dolan et al.

(10) Patent No.: US 7,299,047 B2
(45) Date of Patent: Nov. 20, 2007

(54) WIRELESS COMMUNICATION SYSTEM ENHANCED CALL RECOVERY

(75) Inventors: Michael Francis Dolan, Bolingbrook, IL (US); Douglas Norman Knisely, Wheaton, IL (US); Nick John Mazzarella, Woodridge, IL (US); Orlett Wanda Pearson, Naperville, IL (US); David Albert Rossetti, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 192 days.

(21) Appl. No.: 10/642,599

(22) Filed: Aug. 19, 2003

(65) Prior Publication Data

US 2005/0043048 A1    Feb. 24, 2005

(51) Int. Cl.
*H04Q 7/20* (2006.01)
(52) U.S. Cl. .................. 455/439; 455/436; 455/437; 455/438
(58) Field of Classification Search ............. 455/47.13, 455/67.11, 423, 424, 436, 450, 452.1, 452.2, 455/452, 439, 437, 438, 453, 67.1
See application file for complete search history.

(56) References Cited

U.S. PATENT DOCUMENTS

| | | | |
|---|---|---|---|
| 5,999,816 A * | 12/1999 | Tiedemann et al. | 455/437 |
| 2001/0021653 A1 | 9/2001 | Han | |
| 2002/0045443 A1* | 4/2002 | Hunzinger | 455/421 |
| 2002/0065080 A1* | 5/2002 | Pittampalli et al. | 455/439 |
| 2002/0111158 A1* | 8/2002 | Tee | 455/421 |
| 2003/0012222 A1* | 1/2003 | Rinchiuso | 370/468 |
| 2004/0085894 A1* | 5/2004 | Wang et al. | 370/216 |

OTHER PUBLICATIONS

European Search Report dated Nov. 4, 2004.

* cited by examiner

*Primary Examiner*—Joseph Feild
*Assistant Examiner*—Huy D. Nguyen

(57) ABSTRACT

In a wireless communication system, a method includes monitoring an error condition on an active communication channel, establishing a simultaneous communication channel, and searching the simultaneous communications channel while continuing to monitor the active communication channel.

14 Claims, 4 Drawing Sheets

WIRELESS COMMUNICATION SYSTEM ENHANCED CALL RECOVERY

BACKGROUND OF THE INVENTION

The present invention generally relates to call recovery in a mobile communications system.

Handoff is a general term describing the function of transferring a communication signal for a mobile subscriber from one base station transceiver to another base station transceiver as a subscriber negotiates the wireless territory. There are two general methods of conducting handoff in a wireless communication system, soft and hard handoff. Quality may suffer using either handoff method as the mobile subscriber switches between base stations for individual cells.

Hard handoff typically occurs near the boundaries between cells. Through continuous measurements of received signal power from a mobile subscriber, the base station where the subscriber has established communication determines if the power is reduced below a nominal value near the cell boundary. The hard handoff to a candidate cell's base station occurs instantaneously without disrupting the call in progress. At handoff, the received power at the candidate cell's base station is much greater than required to ensure an ideal handoff. The difference between the current cell's power and the candidate cell's power; however, significantly reduces system capacity by interfering with other users.

A soft handoff occurs throughout a given range of distances from the current and candidate cells' base stations. In the soft handoff method, a mobile subscriber is connected to both base stations as the subscriber travels near the common cell boundary. The decision to switch is made depending upon the reception of the mobile subscriber's pilot signal. A central switching center, often referred to as a mobile switching center, decides at what point one of the base stations should be dropped. Shared communication is performed for a finite period of time, during which time transmission from the current and candidate cells is required.

In a typical wireless communication system, the plurality of signals are transmitted within the same frequency band. This not only applies to mobile subscribers in the same cell, but also to those in all other cells. Since the same frequencies are used, the transmitted power levels from the mobile subscriber and the base station must be monitored closely. If power control is not strictly adhered to, the overall transmission interference and the total number of usable channels is adversely affected. Therefore, the number of signals which can be successfully transmitted and received is associated with the total power of all users.

Both soft and hard handoff methods have shortcomings. Hard handoff can potentially suffer from high drop-out rates. The soft handoff method requires a duplication of transmission resources from the current base station and a base station from at least one candidate cell. The mobile subscriber must establish two concurrent communication links, thereby requiring twice the transmission power which would otherwise be required. The increase in transmission power wastes power, capacity of the air interface to carry transmissions, and contributes to total system interference while the handoff is taking place. The power or energy transmitted in a wireless system by each mobile subscriber should be kept at the minimum necessary to convey information and to minimize interference with the other users. Careful control of transmission power also contributes to extended use of portable devices relying on battery power. Furthermore, diversity combining of the duplicate signals at the central switching center is cumbersome unless the delay from both cell base stations is nearly identical.

SUMMARY OF THE INVENTION

According to an exemplary embodiment of the present invention, a method may include performing operation for establishing a new communication channel if a current communication channel is judged to potentially drop.

According to yet another exemplary embodiment of the present invention, a method may include monitoring an error condition on an active communication channel; establishing a simultaneous communication channel; and searching the simultaneous communications channel while continuing to monitor the active communication channel.

According to yet another exemplary embodiment of the present invention may include initiating call recovery by supplying specific session information to a new channel.

BRIEF DESCRIPTION OF THE DRAWINGS

Exemplary embodiments of the present invention will become more fully understood from the detailed description given hereinbelow and the accompanying drawings, wherein like elements are represented by like reference numerals, which are given by way of illustration only and thus are not limiting on the exemplary embodiments of the present invention and wherein.

DETAILED DESCRIPTION OF EXEMPLARY EMBODIMENTS

The exemplary embodiments of the present invention described herein are merely illustrative of the present invention. Therefore, the exemplary embodiments should not be considered as limiting of the present invention.

First, a general wireless communication system will be described. Second, a method of providing call recovery according to exemplary embodiments of the present invention will be described.

Wireless Communication System

Figure 1:
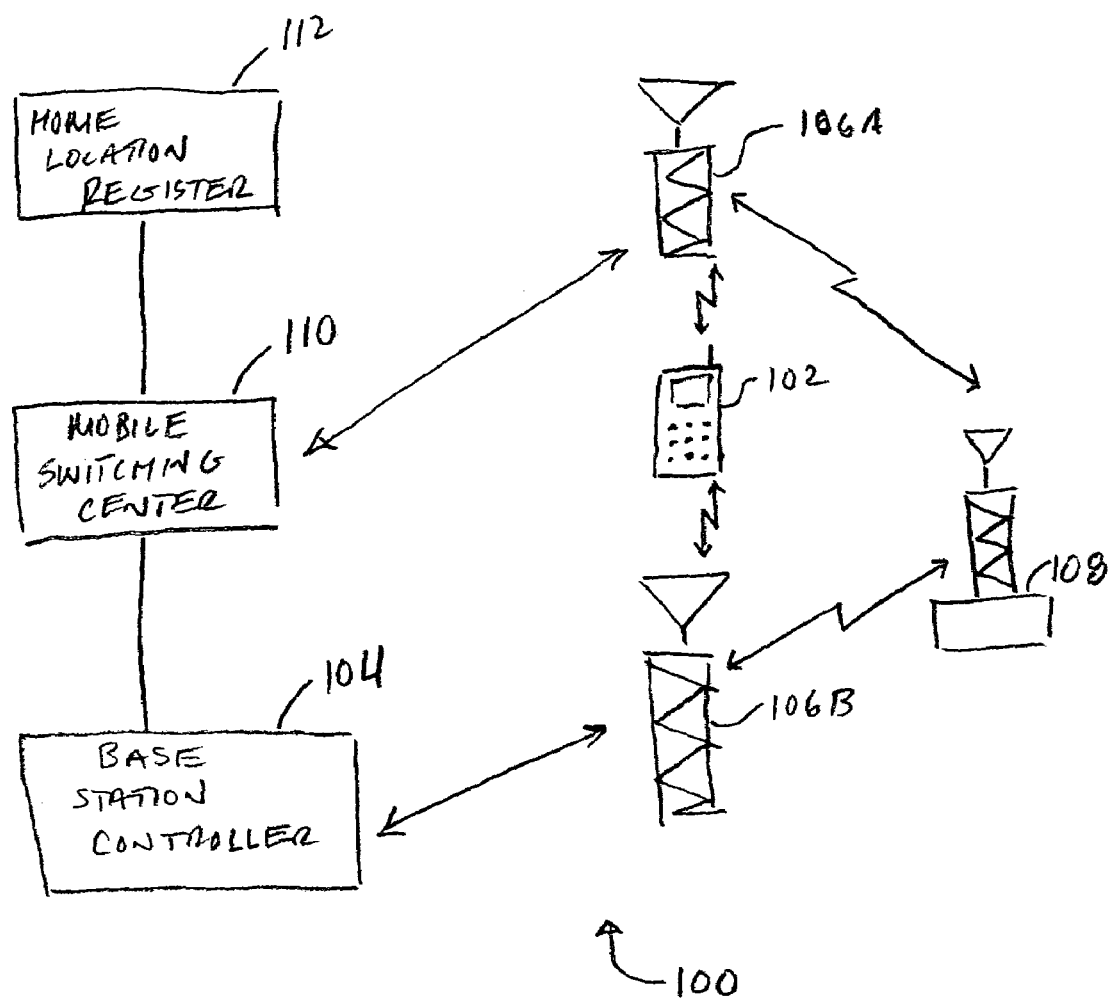
FIG. 1 illustrates a illustrates a general wireless communication system.

FIG. 1 illustrates a wireless communication system 100 that uses multiple access techniques, such as code division multiple access (CDMA), wideband code division multiple access (WCDMA/cdma2000) for communicating between users of user stations (e.g., mobile telephones) and cell sites or base stations.

In FIG. 1, a mobile station 102 communicates with a base station controller 104 by way of one or more base stations 106A, 106B, etc. Similarly, a fixed user station 108 communicates with the base station controller 104, but by way of one or more predetermined and proximate base stations, such as the base stations 106A and 106B.

The base station controller 104 is coupled to and typically includes interface and processing circuitry for providing system control to the base stations 106A and 106B. The base station controller 104 may also be coupled to and communicate with other base stations, and possibly even other base station controllers. The base station controller 104 is coupled to a mobile switching center 110 that in turn is coupled to a home location register 112. During registration of each user station at the beginning of each call, the base station controller 104 and the mobile switching center 110 compare registration signals received from the user stations to data contained in the home location register 112, as is known in the art. Handoffs may occur between the base station controller 104 and other base controllers, and even between the mobile switching center 110 and other mobile switching centers, as is known by those skilled in this technology.

When the system 100 processes voice or data traffic calls, the base station controller 104 establishes, maintains, and terminates the wireless link with the mobile station 102 and the fixed station 108, while the mobile switching center 110 establishes, maintains, and terminates communications with a public switched telephone network (PSTN). While the discussion below focuses on signals transmitted between the base station 106A and the mobile station 102, those skilled in this technology will recognize that the discussion equally applies to other base stations and to the fixed station 108.

Figure 2:
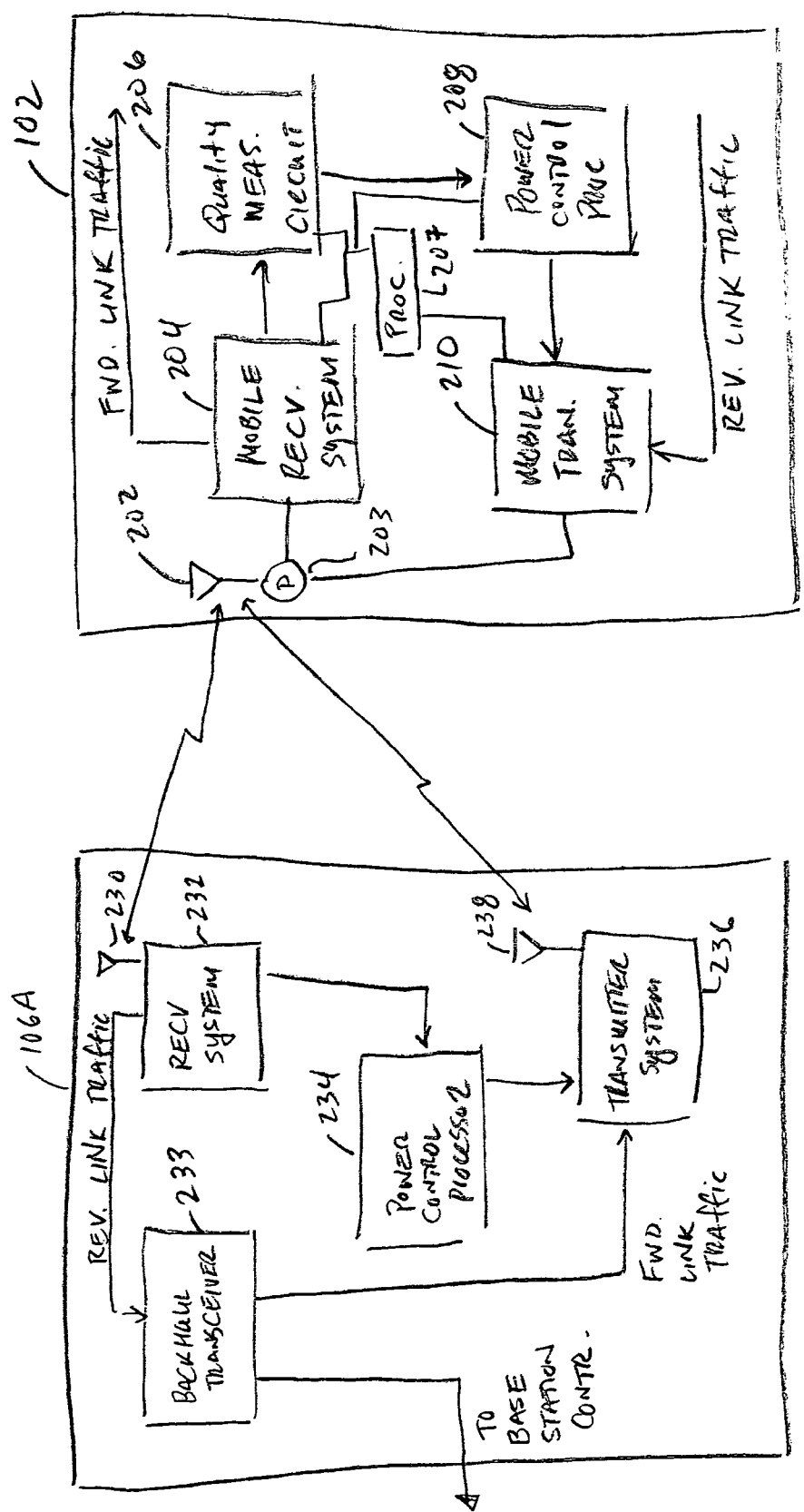
FIG. 2 illustrates a block diagram of general components found in the wireless communication system of FIG. 1.

Referring to FIG. 2, the mobile station 102 includes an antenna 202 that transmits signals to, and receives signals from the base station 106A. A duplexer 203 provides a forward link channel or signal from the base station 106A to a mobile receiver system 204. The receiver system 204 down-converts, demodulates, and decodes the received signal. The receiver system 204 then provides a predetermined parameter or set of parameters to a quality measurement circuit 206. Examples of parameters might include measured signal-to-noise ratio (SNR), measured received power, or decoder parameters such as symbol error rate, Yamamoto metric, or parity bit check indication. A processor 207, may be included for use with exemplary embodiments of the present invention described herein. The processor 207 may be physically connected to one or more components of the mobile station 102.

The quality measurement circuit 206 receives the parameters from the receiver system 204 and determines a quality measurement signal or power level of the received signal. Based on these measurements, the quality measurement circuit 206 produces a power level signal. This process is generally understood by those skilled in the art.

A power control processor 208 receives the power level signal from the quality measurement circuit 206, compares the signal to a threshold, and produces a power control message based on the comparison. Each power control message can indicate a change in power for the forward link signal. Alternatively, the power control processor 208 produces power control messages representing the absolute power of the received forward link signal, as is known in the art. The power control processor 208 may produce several power control messages in response to several power level signals per frame. While the quality measurement circuit 206 and power control processor 208 are generally described herein as separate components, such components can be monolithically integrated, or the operations performed by such components can be performed by a single microprocessor.

A mobile transmission system 210 encodes, modulates, amplifies, and up converts the power control messages, via the duplexer 203 and the antenna 202. In the illustrated exemplary embodiment, the mobile transmission system 210 provides the power control message in a predetermined location of an outgoing reverse link frame.

The mobile transmission system 210 also receives reverse link traffic data, such as voice or data, from the user of the mobile station 102. The mobile transmission system 210 requests a particular service (including power/rate) from the base station 106A based on the traffic data to be transmitted. In particular, the mobile transmission system 210 requests bandwidth allocation appropriate for the particular service. The base station 106A then schedules or allocates bandwidth (power/rate) resources based on requests from the mobile station 102 and other users to optimize such resource allocation, given power constraints of the system. Thus, effectively managing transmission power in the system will permit more effective bandwidth use.

The base station 106A includes a receiving antenna 230 that receives the reverse link frames from the mobile station 102. A receiver system 232 of the base station 106A down converts, amplifies, demodulates, and decodes the reverse link traffic. A backhaul transceiver 233 receives and forwards to the base station controller 104 reverse link traffic. The receiver system 232 also separates the power control messages from each reverse link traffic frame and provides the power control messages to a power control processor 234.

The power control processor 234 monitors the power control messages and produces a forward link transmitter power signal to a forward link transmitter system 236. The forward link transmitter system 236, in response thereto, either increases, maintains, or decreases the power of the forward link signal. The forward link signal is then transmitted via a transmitting antenna 238. Additionally, the power control processor 234 analyzes the quality of the reverse link signal from the mobile station 102 and provides appropriate feedback control messages to the forward link transmitter system 236. The forward link transmitter system 236, in response thereto, transmits the feedback control messages via the transmitting antenna 238 over the forward link channel to the mobile station 102. The transmitter system 236 also receives forward link traffic data from the base station controller 104 via the backhaul transceiver 233. The forward link transmitter system 236 encodes, modulates, and transmits via the antenna 238 the forward link traffic data.

Both the forward link signal and the reverse link signal include various channels. Generally, the forward link signal may include the following: a pilot channel, a paging channel, a sync channel, a fundamental channel, a supplementary channel, a forward dedicated common control channel and a quick paging channel. The reverse link signal may generally include the following: a pilot channel, an access channel, a dedicated control channel, a fundamental channel, a reverse dedicated control channel and a supplementary channel. Other channels on the forward and reverse signals may also be present depending on the operation of the wireless communication system 100. The definitions and operational characteristics of the stated channels have not been discussed in detail herein, as such definitions and characteristics are understood by those having ordinary skill in the relevant arts.

Unless described otherwise herein, the construction and operation of the various blocks and elements shown in FIGS. 1 and 2 and the other figures are of conventional design and operation. Thus, such blocks or elements need not be described in further detail because they will be understood by those skilled in the relevant art. Any additional description is omitted for brevity and to avoid obscuring the detailed description of exemplary embodiments of the present invention. Any modifications necessary to the blocks of the wireless communication system 100 illustrated in FIGS. 1 and 2, or the other systems shown therein, can be readily made by one skilled in the relevant arts.

Call Recovery Method

The call recovery method according to an exemplary embodiment of the present invention may be implemented in the wireless communication system 100 illustrated in FIGS. 1 and 2. For example, the call recovery method may be software coded or hardware imbedded into the processor 207 of mobile station 102. However, it should be understood that this is only one example of an implementation of an exemplary embodiment of the present invention.

Figure 3:
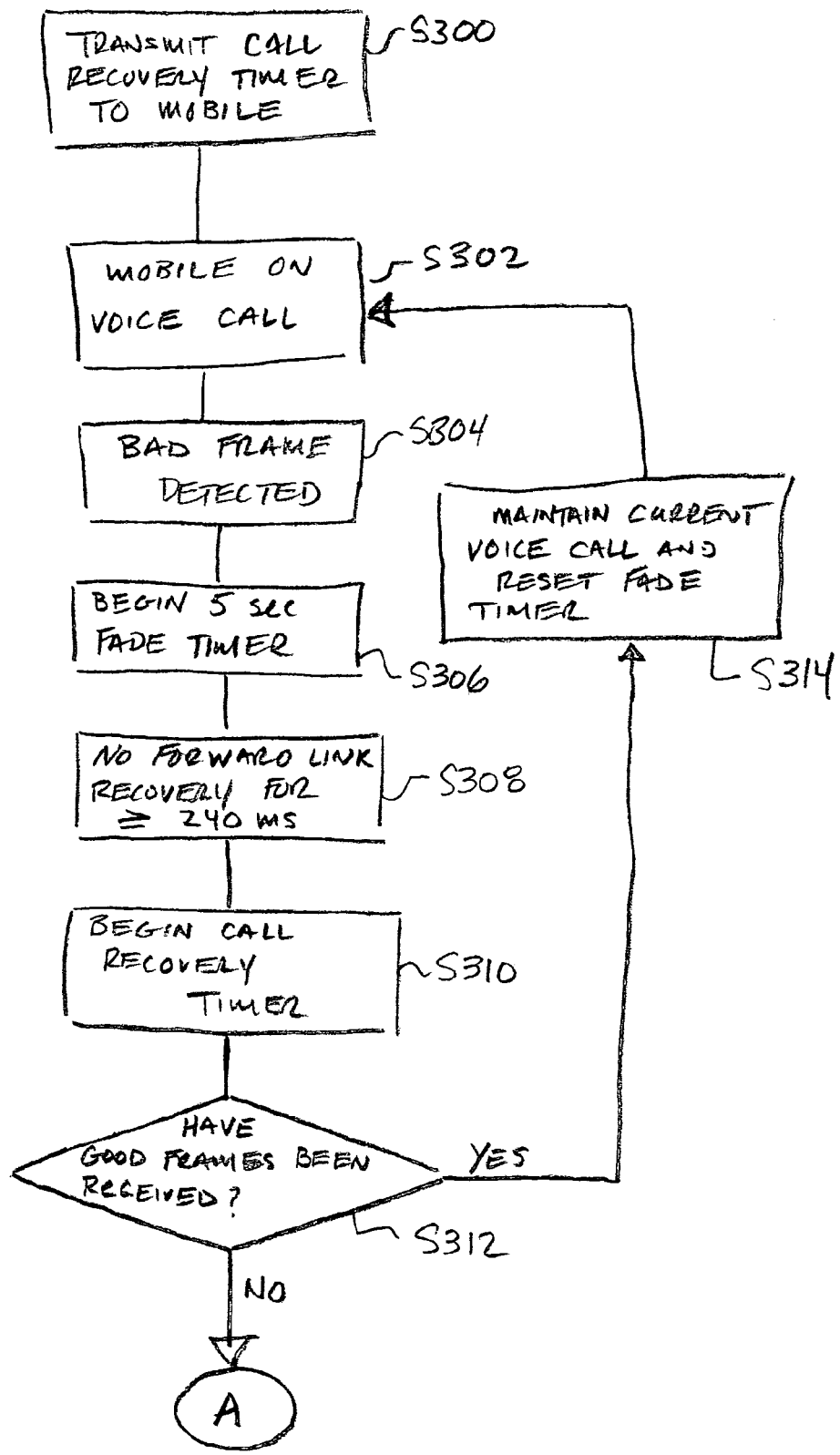
FIG. 3 illustrates a call recovery method, depicted in flowchart form, according to an exemplary embodiment of the present invention.
Figure 4:
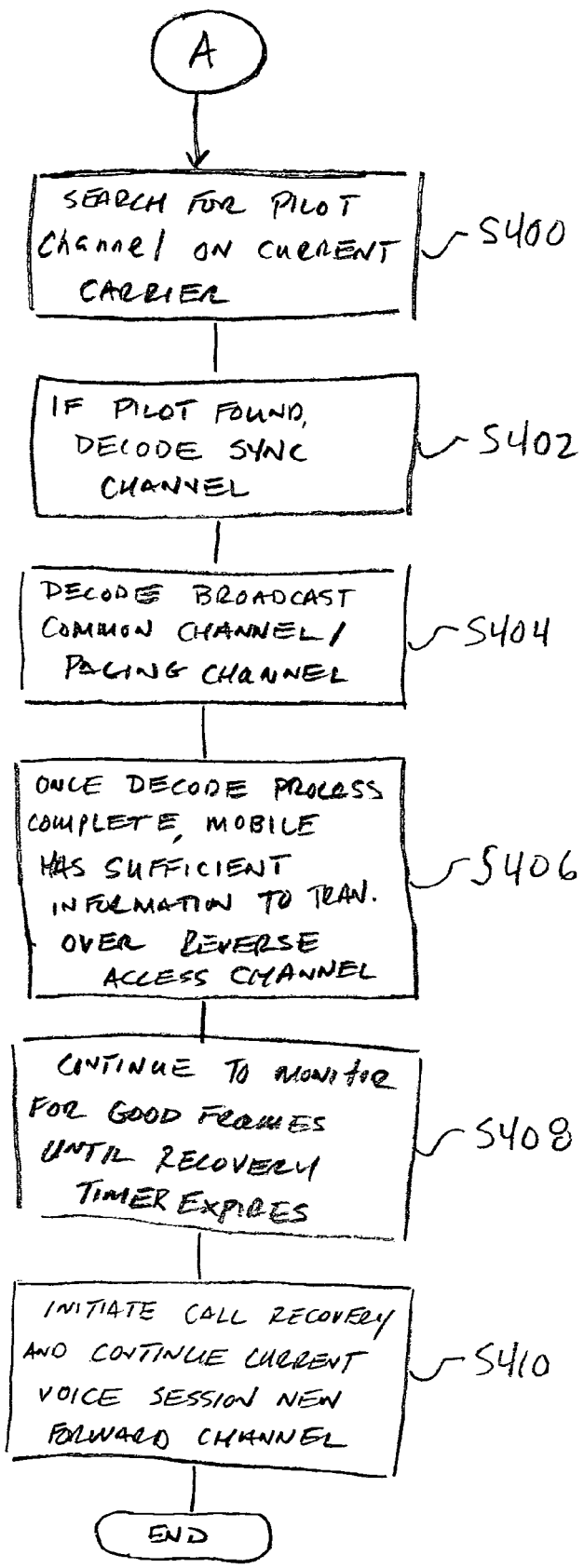
FIG. 4 illustrates a continuation of the call recovery method illustrated in FIG. 3.

FIGS. 3-4 illustrates a call recovery method, in flowchart form, according to an exemplary embodiment of the present invention. Initially, a transmit call recovery timer is sent to the mobile station 102 by way of the base station controller 104 and/or the mobile switching center 110 (S400). The transmit call recovery timer may also originate from any one of the base stations 106A and 106B.

In one exemplary embodiment of the present invention, the call recovery timer is a 3-bit value that is representative of a predetermined number of seconds. For example, if the 3-bit number is '000', the call recovery timer would have a value of 1.5 seconds. Generally, the call recovery timer is one of: '000'=1.5 sec., '001'=2 sec., . . . '111'=5 sec. As those of ordinary skill in the art recognize, if the call recovery timer is set to '111', then the call recovery timer will have no affect on the operation of the wireless system 100. In particular, most mobile communication devices in operation at the time of the present invention have a fade timer that functions to drop a call if particular signal weakness is detected after the expiration of a 5 second period.

It is assumed that the mobile station 102, in receipt of the call recovery timer, is currently on a voice call (S302). As it appreciated by those of ordinary skill in the relevant arts, the mobile station 102 monitors a received signal for errors, such as bad frames (S304). Once a bad frame is detected, the mobile station waits for 11 more frames for a total of 240 ms to determine if the signal has been recovered. If not the mobile station fade timer, normally having a duration of 5 seconds, is then initiated (S306).

After approximately 240 ms, or 12 bad frames received by the mobile station 102, the mobile station 102 initiates the call recovery timer (S308-S310). When the call recovery timer is active, the mobile station 102 will monitor two channels simultaneously. In particular, the mobile station 102 will monitor its current channel for possible receipt of good frames (S312). If good frames are received on the current channel, the mobile station 102 will maintain the current channel as active, and reset the fade and call recovery timers (S314).

The process of monitoring a second channel may be generally considered the preliminary processing that occurs to establish call recovery. The process and processing of call recovery will be further described in the following paragraphs.

FIG. 4 illustrates a continuation of the flowchart illustrated in FIG. 3. As described, the mobile station 102 monitors two channels simultaneously while the call recovery timer is active. During repetitive reception of bad frames on the current channel and while the call recovery timer is active, the mobile station 102 initiates a search of a pilot channel on the active carrier (S400). Once a pilot channel is found, the mobile station 102 decodes the sync channel (S402). The mobile station 102 then decodes the broadcast common channel and/or the paging channel (S404). During this process, the call recovery timer is still active.

After completing the decoding process described in S402-S404, the mobile station 102 is in possession of sufficient information to establish a voice session over the reverse access channel. In particular, the mobile station 102 is ready to receive and send voice information over a new channel.

The mobile station 102 continues to monitor its current channel for good frames until the call recovery timer expires (S408). If two or more consecutive good frames are received before the call recovery timer expires, the current channel is maintained. However, if the call recover timer expires before two or more consecutive good frames are received, call recovery is initiated over the subsequently decoded reverse access channel.

Namely, to complete call recovery, the mobile station 102 sends a origination message containing information relating to the call being recovered via the subsequently decoded reverse access channel. The origination message may include the system ID, network ID and packet zone ID of the of the session lost on the original channel. Moreover, the origination message may include an indication that the call recovery is being used. In response to the origination message, call recovery is established once the mobile station 102 receives a channel assignment message from one of the base stations 106A and 106B, the base station controller 104 and the mobile switching center 110. In other words, one of the base stations 106A and 106B, the base station controller 104 and the mobile switching center 110 retrieves the relevant call data associated with the origination message so that the information of the session lost on the original channel may be used on the new channel. At this time, traffic over the new channel may commence, where the traffic is that which was on the original channel that experienced bad frames. Therefore, according to an exemplary embodiment of the present invention, a call that would normally be dropped is recovered and continues to commence over the new channel.

The exemplary embodiments of the present invention being thus described, it will be obvious that the same may be varied in many ways. Such variations are not to be regarded as a departure from the spirit and scope of the exemplary embodiments of the invention, and all such modifications as would be obvious to one skilled in the art are intended to be included within the scope of the following claims.

What is claimed is:

1. A method in a wireless communication system comprising:

activating a call recovery timer in response detecting an error condition on a current communication channel, monitoring the current communication channel while establishing a new communication channel;

resetting the call recovery timer if good frames are received on the current communication channel;

establishing a new communication channel if the current communication channel is judged to potentially drop; and dropping the current communication if the call recovery timer expires.

2. The method according to claim 1, wherein establishing the new communication channel includes detecting the presence of at least a plurality of bad frames on the current communication channel.

3. The method according to claim 2, wherein the cell recovery timer is activated once at least 12 bad frames are detected on the current communication channel.

4. The method according to claim 1, wherein the call recovery timer is less than 5 seconds.

5. The method according to claim 1, wherein establishing the new communication channel includes searching for a pilot channel on an active carrier.

6. The method according to claim 5, wherein establishing the new communication channel further includes decoding a sync channel and at least one of a broadcast common channel and a paging channel.

7. The method according to claim 6, further including using the new communication channel to continue a session on the current communication channel.

8. A method, comprising in a wireless communication system:
- activating a call recovery timer in response detecting to an error condition on an active communication channel;
- monitoring the error condition on the active communication channel;
- establishing a simultaneous communication channel while the call recovery timer is active;
- searching the simultaneous communications channel while continuing to monitor the active communication channel;
- resetting the call recovery timer if good frames are received on the active communication channel; and
- dropping the current communication channel if the call recovery timer expires.

9. The method according to claim 8, further comprising:
- establishing an active communication session on the simultaneous communication channel if the call recovery timer elapses.

10. The method according to claim 8, wherein the call recovery timer is less than a fade timer.

11. The method according to claim 8, wherein the call recovery timer is transmitted from a wireless system base station.

12. A method, comprising in a wireless communication system:
- supplying specific session information to a new channel to assist a call recovery process, the call recovery process initiated by a call recovery timer in response to detecting an error condition on an active channel;
- monitoring the active channel while establishing the new channel;
- resetting the call recovery timer if good frames are received on the active channel; and
- dropping the active channel if the call recovery timer expires.

13. The method according to claim 12, further comprising:
- receiving an origination message requesting voice communication with a user currently using the active channel.

14. The method according to claim 13, further comprising:
- authorizing voice communication with the user.

* * * * *